United States Patent
Qian et al.

(10) Patent No.: US 11,228,553 B2
(45) Date of Patent: Jan. 18, 2022

(54) MOBILE BASED COLLABORATIVE AND INTERACTIVE OPERATIONS WITH SMART MOBILE DEVICES

(71) Applicant: YOKOGAWA ELECTRIC CORPORATION, Tokyo (JP)

(72) Inventors: Jinsong Qian, Singapore (JP); Andrew Nathanael, Singapore (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 183 days.

(21) Appl. No.: 14/879,226

(22) Filed: Oct. 9, 2015

(65) Prior Publication Data

US 2017/0085603 A1 Mar. 23, 2017

(30) Foreign Application Priority Data

Sep. 21, 2015 (SG) .............................. 10201507834S

(51) Int. Cl.
*H04L 12/58* (2006.01)
(52) U.S. Cl.
CPC ............ *H04L 51/26* (2013.01); *H04L 51/046* (2013.01); *H04L 51/38* (2013.01)
(58) Field of Classification Search
CPC ....... H04L 65/403; H04L 51/26; H04L 47/22; H04L 29/06401; H04L 65/4015; H04L 51/16; G06F 17/5004; G06F 16/9536; G06F 9/3009; G06F 9/30123; G06F 9/48; G06F 2209/5018; G05B 15/02; G06Q 10/101; G06Q 10/103; H04W 72/1215
See application file for complete search history.

(56) References Cited

U.S. PATENT DOCUMENTS

| | | | | | |
|---|---|---|---|---|---|
| 5,404,529 | A | * | 4/1995 | Chernikoff | G06F 9/4488 719/315 |
| 5,455,951 | A | * | 10/1995 | Bolton | G06F 9/4488 718/103 |
| 5,519,867 | A | * | 5/1996 | Moeller | G06F 9/4488 718/107 |

(Continued)

FOREIGN PATENT DOCUMENTS

| | | | | | |
|---|---|---|---|---|---|
| BR | PI1106789 A2 | * | 7/2015 | ........ | H04M 1/72406 |
| CA | 2842605 A1 | * | 8/2014 | ............ | H04L 51/16 |

(Continued)

OTHER PUBLICATIONS

Kim, "Internet-centric solution is more than moving online", 2015.*

(Continued)

*Primary Examiner* — Ondrej C Vostal
(74) *Attorney, Agent, or Firm* — Sheridan Ross P.C.

(57) ABSTRACT

A system, method, and an apparatus relate to a system for electronic communication between personnel, and sharing tasks and plant device operating statuses. The use of electronic communication allows for interaction between personnel at different locations and provides real time communication between personnel regardless of their location, whether they are on-site, in a meeting, or out of office. Additionally, the use of electronic communication allows for concurrent viewing of information by all the personnel rather than individually viewing a singular physical log book.

20 Claims, 10 Drawing Sheets

(56) References Cited

U.S. PATENT DOCUMENTS

| | | | | |
|---|---|---|---|---|
| 5,987,496 A * | 11/1999 | Shen | H04L 47/22 | 709/200 |
| 6,157,864 A * | 12/2000 | Schwenke | G05B 19/41865 | 700/79 |
| 6,337,971 B1 * | 1/2002 | Abts | A01G 25/092 | 331/65 |
| 6,477,667 B1 * | 11/2002 | Levi | B60R 25/04 | 714/48 |
| 6,981,047 B2 * | 12/2005 | Hanson | H04L 1/188 | 709/227 |
| 7,359,836 B2 * | 4/2008 | Wren | G06K 9/00771 | 702/189 |
| 7,386,848 B2 * | 6/2008 | Cavage | G06F 9/3851 | 718/100 |
| 7,401,112 B1 * | 7/2008 | Matz | G06F 9/5038 | 379/265.02 |
| 7,418,718 B2 * | 8/2008 | Liu | G06F 9/50 | 719/328 |
| 7,756,947 B2 * | 7/2010 | Yang | G06F 9/4446 | 340/286.02 |
| 7,962,707 B2 * | 6/2011 | Kaakani | G06F 12/0269 | 707/813 |
| 8,116,446 B1 * | 2/2012 | Kalavar | H04M 3/5232 | 379/265.13 |
| 8,150,959 B1 * | 4/2012 | Bezdicek | G05B 23/027 | 709/224 |
| 8,171,081 B1 * | 5/2012 | Wang | G06F 16/10 | 709/204 |
| 8,554,844 B2 * | 10/2013 | Robertson | G06F 16/9577 | 709/206 |
| 8,635,204 B1 * | 1/2014 | Xie | G06F 8/74 | 707/709 |
| 2002/0120459 A1 * | 8/2002 | Dick | G06Q 10/06316 | 705/7.26 |
| 2002/0123880 A1 * | 9/2002 | Brown | G06F 40/45 | 704/4 |
| 2002/0133359 A1 * | 9/2002 | Brown | G06Q 10/06 | 705/1.1 |
| 2003/0035409 A1 * | 2/2003 | Wang | H04L 69/164 | 370/349 |
| 2003/0131064 A1 * | 7/2003 | Bell, III | H04L 51/24 | 709/206 |
| 2004/0002958 A1 * | 1/2004 | Seshadri | H04L 51/24 | 709/206 |
| 2004/0032429 A1 * | 2/2004 | Shah | G06F 3/0481 | 715/771 |
| 2004/0164166 A1 * | 8/2004 | Mahany | G06F 11/324 | 235/472.02 |
| 2004/0177342 A1 * | 9/2004 | Worley, Jr. | G06F 9/545 | 717/121 |
| 2004/0179036 A1 * | 9/2004 | Teplov | G06F 3/1454 | 715/751 |
| 2004/0181577 A1 * | 9/2004 | Skurikhin | G06Q 10/10 | 709/204 |
| 2004/0181579 A1 * | 9/2004 | Huck | G06Q 10/10 | 709/205 |
| 2004/0181796 A1 * | 9/2004 | Fedotov | G06F 3/1454 | 719/323 |
| 2004/0204775 A1 * | 10/2004 | Keyes | G05B 13/042 | 700/29 |
| 2005/0065913 A1 * | 3/2005 | Lillie | G06F 17/30873 | |
| 2005/0114494 A1 * | 5/2005 | Beck | G06N 5/025 | 709/224 |
| 2005/0278152 A1 * | 12/2005 | Blaszczak | G06F 16/283 | 703/1 |
| 2006/0026672 A1 * | 2/2006 | Braun | G05B 19/042 | 726/9 |
| 2006/0248449 A1 * | 11/2006 | Williams | G06F 9/451 | 715/209 |
| 2007/0044104 A1 * | 2/2007 | Beatty, III | G06F 9/4881 | 718/108 |
| 2007/0253424 A1 * | 11/2007 | Herot | H04L 12/1818 | 370/395.2 |
| 2007/0290787 A1 * | 12/2007 | Fiatal | H04W 4/08 | 340/2.1 |
| 2008/0141144 A1 * | 6/2008 | Muller | G06Q 10/06 | 715/751 |
| 2009/0077194 A1 * | 3/2009 | Ohno | H04L 1/00 | 709/213 |
| 2009/0086021 A1 * | 4/2009 | Baier | H04N 7/18 | 348/143 |
| 2009/0088875 A1 * | 4/2009 | Baier | G05B 19/41865 | 700/83 |
| 2009/0089225 A1 * | 4/2009 | Baier | G06Q 10/06 | 706/12 |
| 2009/0234675 A1 * | 9/2009 | Irakam | G06Q 10/10 | 705/3 |
| 2010/0005087 A1 * | 1/2010 | Basco | G06F 16/951 | 707/E17.017 |
| 2010/0175075 A1 * | 7/2010 | Acedo | G06F 9/547 | 719/328 |
| 2010/0207719 A1 * | 8/2010 | Skourup | G05B 23/0267 | 340/3.7 |
| 2010/0333113 A1 * | 12/2010 | Johnson | G06F 9/4881 | 719/318 |
| 2011/0153352 A1 * | 6/2011 | Semian | G06Q 10/06 | 705/2 |
| 2011/0273303 A1 * | 11/2011 | Keever | G01J 1/32 | 340/635 |
| 2012/0110087 A1 * | 5/2012 | Culver | G06F 17/5004 | 709/205 |
| 2012/0317215 A1 * | 12/2012 | Brunner | G06Q 10/107 | 709/206 |
| 2013/0012220 A1 * | 1/2013 | Waris | H04W 4/21 | 455/450 |
| 2013/0124465 A1 * | 5/2013 | Pingel | G06F 3/0604 | 707/610 |
| 2013/0173800 A1 * | 7/2013 | Okuyama | H04L 41/22 | 709/225 |
| 2013/0191481 A1 * | 7/2013 | Prevost | H04L 51/14 | 709/206 |
| 2013/0268807 A1 * | 10/2013 | Spencer | G06F 11/1415 | 714/18 |
| 2013/0290436 A1 * | 10/2013 | Martin | G06Q 10/107 | 709/206 |
| 2014/0039648 A1 * | 2/2014 | Boult | G05B 15/02 | 700/79 |
| 2014/0068632 A1 * | 3/2014 | Tan | G06F 9/54 | 719/313 |
| 2014/0075004 A1 * | 3/2014 | Van Dusen | H04L 41/04 | 709/223 |
| 2014/0164080 A1 * | 6/2014 | Thompson, Jr. | G06Q 30/02 | 705/14.16 |
| 2014/0188576 A1 * | 7/2014 | de Oliveira | G06Q 10/06395 | 705/7.39 |
| 2014/0207874 A1 * | 7/2014 | Soorianarayanan | H04L 65/403 | 709/206 |
| 2014/0207875 A1 * | 7/2014 | Messinger | H04W 4/38 | 709/206 |
| 2014/0229389 A1 | 8/2014 | Pantaleano et al. | | |
| 2014/0229405 A1 * | 8/2014 | Govrin | G06N 5/04 | 706/11 |
| 2014/0229412 A1 * | 8/2014 | Gupta | G06F 16/3323 | 706/20 |
| 2014/0245178 A1 * | 8/2014 | Smith | H04L 51/16 | 715/753 |
| 2014/0280602 A1 * | 9/2014 | Quatrano | H04L 67/02 | 709/205 |
| 2014/0289644 A1 * | 9/2014 | Clarke | G06F 3/048 | 715/752 |
| 2014/0299389 A1 * | 10/2014 | Coleman | G01L 1/2262 | 177/1 |
| 2014/0303782 A1 * | 10/2014 | Pruchniewski | H04L 47/70 | 700/275 |
| 2014/0316804 A1 * | 10/2014 | Tran | H04L 67/12 | 705/2 |
| 2015/0026687 A1 * | 1/2015 | Yim | G06F 9/522 | 718/102 |

(56) References Cited

U.S. PATENT DOCUMENTS

| | | | |
|---|---|---|---|
| 2015/0100892 A1* | 4/2015 | Cronin | G06Q 10/06 715/747 |
| 2015/0116482 A1* | 4/2015 | Bronmark | G05B 19/042 348/129 |
| 2015/0135300 A1* | 5/2015 | Ford | H04L 63/0281 726/11 |
| 2015/0163206 A1* | 6/2015 | McCarthy | G06F 21/6227 713/171 |
| 2015/0199530 A1* | 7/2015 | Thanos | G01D 4/002 713/164 |
| 2015/0287318 A1* | 10/2015 | Nair | G08C 17/02 340/5.52 |
| 2015/0294319 A1* | 10/2015 | Dyrdal | G06Q 10/06 705/317 |
| 2015/0339158 A1* | 11/2015 | Harris | G06F 9/50 718/103 |
| 2015/0347971 A1* | 12/2015 | D'Amore et al. | G06Q 10/101 705/300 |
| 2015/0350143 A1* | 12/2015 | Yang | H04L 51/16 345/173 |
| 2015/0350820 A1* | 12/2015 | Son | H04W 4/008 455/41.2 |
| 2015/0356491 A1* | 12/2015 | Saliba | G06Q 10/063112 705/7.14 |
| 2015/0371136 A1* | 12/2015 | Goossen | G06Q 10/06 706/46 |
| 2015/0373149 A1* | 12/2015 | Lyons | G05B 15/02 709/203 |
| 2016/0039426 A1* | 2/2016 | Ricci | H04W 48/04 701/1 |
| 2016/0072270 A1* | 3/2016 | Rostron | H02H 3/081 700/294 |
| 2016/0078004 A1* | 3/2016 | Butler | G06F 17/214 715/269 |
| 2016/0102879 A1* | 4/2016 | Guest | G05B 15/02 700/276 |
| 2016/0154679 A1* | 6/2016 | Kim | G06F 8/443 718/104 |
| 2016/0364927 A1* | 12/2016 | Barry | H04L 63/08 |
| 2018/0109955 A1* | 4/2018 | Nixon | G06F 16/2428 |
| 2018/0115496 A1* | 4/2018 | Eckert | H04L 47/50 |
| 2018/0293021 A1* | 10/2018 | Fossen | G06F 3/0655 |

FOREIGN PATENT DOCUMENTS

| | | | | |
|---|---|---|---|---|
| CN | 1997228 A | * | 7/2007 | H04M 1/72406 |
| CN | 102843432 A | | 12/2012 | |
| CN | 102934142 A | * | 2/2013 | G16H 40/67 |
| CN | 104685489 A | * | 6/2015 | G06Q 50/10 |
| EP | 2658190 B1 | * | 8/2014 | G06Q 10/107 |
| GB | 2513709 A | * | 11/2014 | G05B 19/41865 |
| GB | 2556444 A | * | 5/2018 | G05B 19/4185 |
| WO | WO-2005041600 A1 | * | 5/2005 | H04L 67/14 |

OTHER PUBLICATIONS

Microsoft Computer Dictionary, "real-time", 2002, p. 441.*
Wikipedia, "Internet of things", 2019 (Year: 2019).*
Microsoft Computer Dictionary, "real time", 5th edition, 2002, p. 441 (Year: 2002).*
Law Insider, "industrial plant", 2021 (Year: 2021).*
Yogesh, "A system and method for providing and receiving user services, real time and social searching and sharing", IN1203MUM2010A, 2010 (Year: 2010).*
Communication dated Sep. 29, 2016 from the Intellectual Property Office of Singapore in counterpart Application No. 10201507834S.
Communication dated Aug. 5, 2019 from the National Intellectual Property Administration of P.R.C. in application No. 201610081521.3.

* cited by examiner

MOBILE BASED COLLABORATIVE AND INTERACTIVE OPERATIONS WITH SMART MOBILE DEVICES

CROSS-REFERENCE TO RELATED APPLICATION

This application claims priority from Singaporean Patent Application No. 10201507834S, filed on Sep. 21, 2015, in the Intellectual Property Office of Singapore (IPOS), the disclosure of which is incorporated herein by reference in its entirety.

FIELD OF THE INVENTION

Exemplary embodiments relate to multi-user communications systems and methods, user interfaces, and particularly, with respect to the monitoring of industrial automation processes.

BACKGROUND

In the related art within industrial plant environments, particularly those utilizing Industrial Automation (IA), there are daily tasks that are performed collaboratively by a group of users, such as operators, supervisors, and/or managers.

In related art references US2014/0277618 and US2013/0212186, there are methods for collaboratively assisting a control room operator including receiving a notification associated with a person via a portable wireless device. However, the related art references merely allow modification of a received notification or message using annotations of text, audio, or video. The related art does not allow other users whom receive a notification to access equipment data in real time based on a role of the user.

For many tasks, continuity between multiple persons is required to ensure proper functioning of plant devices. In such cases, a physical paper log or report book may be used. Such a log is especially important where there are changes in personnel, such as during shift changes. The usage of a physical log allows for a following team of personnel to review and understand the operating statuses of the plant devices with minimal need for overlap with the team of personnel of a previous shift for discussion and updates. In paperless environments, the physical log may be digitized, but for access only on a console in a control room. Nonetheless, since the exchange of information is only when a new team shift begins, and after a previous team has departed, there is no opportunity for real time exchanges of questions and answers.

SUMMARY

One or more embodiments of the disclosure relate to a system for electronic communication among personnel on the same or different teams, and the sharing of tasks and plant device operating statuses. The use of electronic communication allows for interaction among personnel at different locations and provides real time communication among personnel regardless of their location, whether they are on-site, in a meeting, or out of office. Additionally, the use of electronic communication allows for concurrent access to, viewing of, and action on information by all the personnel in a team, rather than individually viewing a singular physical log book or console. Such a system for electronic communication and related structures and operations overcome the limitations that users currently experience with the physical and digital logs.

For example, physical log systems or digitalized logs on a console inherently encounter delays in dissemination of information to all the relevant users. The delay results in a lack of real-time collaboration for location- or time-distributed team members. Additionally, the use of a physical or digital log does not provide any means of directly including real time process data or sharing the real time process data with other team members or users.

Embodiments of the disclosure provide a means for real-time communication, monitoring, and decision making for all personnel related to a particular task. One or more embodiments provide a communication method that can overcome problems with distributed staff locations, as well as conflicts on work shifts. By providing a communication method as such, all relevant staff, whether or not within the plant, will be informed of issues and can participate in decision making processes in real time without delay. Additionally, the use of such a communication method provides audit traceability, especially when combined with a log saving or exporting feature.

One or more embodiments of the disclosure relate to a method for communication and sharing of an equipment operating indicator for a plurality of users. The method includes building a user group from the plurality of users for communication, sending information inputted by a user of the user group to the user group, receiving information from the user group, accessing an equipment operating parameter from a system, generating an equipment operating status from the equipment operating parameter, and sending the equipment operating status to the user group.

In some embodiments, the user group can be predefined. In other embodiments, the user group can be created on the fly or ad hoc by a user of the plurality of users.

In some embodiments, the method includes organizing the sent or received information for displaying based on a priority indicator of the sent or received information.

According to an embodiment of the disclosure, the sent or received information includes at least one of an equipment operating indicator, a text message, a voice message, a photograph, and a video.

According to an embodiment of the disclosure, the accessing of the equipment operating parameter from the system comprises accessing a real time equipment operating parameter from a server of the system.

In addition, the sent or received information may include a task, as well as a task completion status that is transmitted back to a server of the system for storage.

The sending of the equipment operating status to the user group may allow for concurrent viewing of the equipment operating status by all members of the user group.

One or more embodiments of the disclosure relate to a system for communicating and sharing of an equipment operating indicator for a plurality of users. The system includes at least one non-transitory computer readable medium operable to store program code and at least one processor operable to read the program code and operate as instructed by the program code.

The program code includes building code that builds a user group from the plurality of users for group communication, information sending code that sends information from a user of the user group to the members of the user group, receiving code that contains [effects receipt of] information from the user group, accessing code that represents [effects access to] an equipment operating parameter from a system, generating code that represents an equipment operating status from the equipment operating parameter, and status sending code that sends the equipment operating status to the user group.

According to an embodiment, the program code also includes organizing code that organizes the sent or received information for displaying based on a priority indicator of the sent or received information.

In addition, the sent or received information may include at least one of an equipment operating indicator, a text message, a voice message, a photograph, and a video.

According to an embodiment of the disclosure, the accessing of the equipment operating parameter from the system comprises accessing a real time equipment operating parameter from a server of the system.

In addition, the sent or received information may include a task and task completion status that is transmitted back to a server of the system for storage.

The sending of the equipment operating status to the entire user group may allow for concurrent viewing of the equipment operating status by the user group and control of the equipment.

One or more embodiments of the disclosure relate to an apparatus for the communicating and sharing of an equipment operating indicator for a plurality of users. The apparatus includes at least one non-transitory computer readable medium operable to store program code and at least one processor operable to read the program code and operate as instructed by the program code.

The program code includes building code that builds a user group from the plurality of users for communication, information sending code that sends information from a user of the user group to the entire user group, receiving code that effects receipt of information from the user group, accessing code that effects accesses to equipment operating parameters from a system, generating code that represents an equipment operating status for an equipment operating parameter, and status sending code that sends the equipment operating status to the user group.

According to an embodiment, the program code also includes organizing code that organizes the sent or received information for display, based on a priority indicator of the sent or received information.

In addition, the sent or received information may include at least one of an equipment operating indicator, a text message, a voice message, a photograph, and a video.

According to an embodiment of the disclosure, accessing of the equipment operating parameter from the system comprises accessing a real time equipment operating parameter from a server of the system.

In addition, the sent or received information may include a task and task completion status that is transmitted back to a server of the system for storage.

The sending of the equipment operating status to the user group may allow for concurrent viewing of the equipment operating status by the user group.

DETAILED DESCRIPTION

Figure 1:
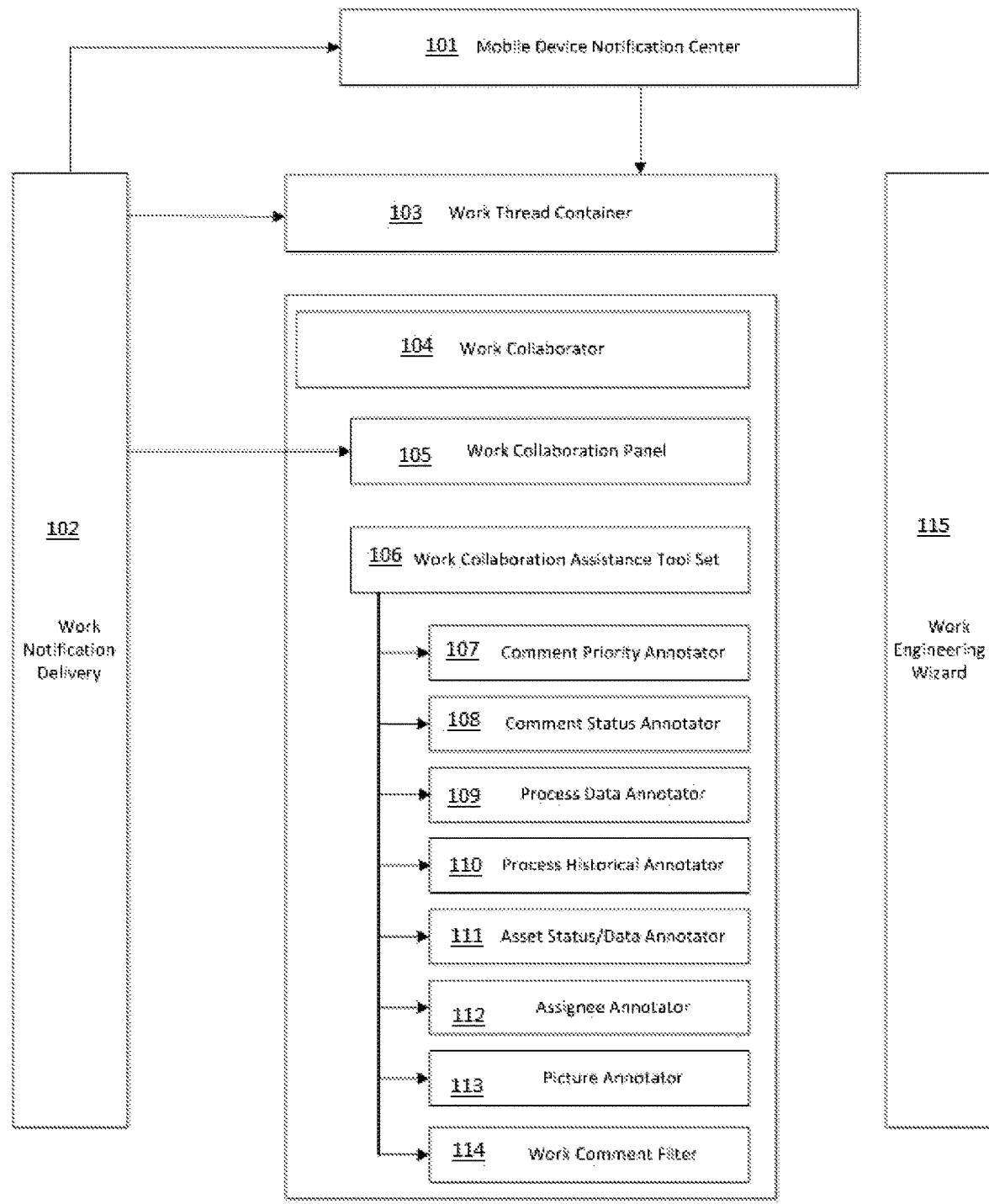
FIG. 1 illustrates an exemplary system architecture for communicating information relating to a work item.

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In contrast to the existing method of maintaining a physical log book or digital file, the use of electronic communication in accordance with the present invention allows for interaction among personnel at different locations and provides real time communication among personnel in a group, regardless of their location, whether they are on-site, in a meeting, or out of office. Additionally, the use of electronic communication allows for concurrent viewing of information by all the personnel regardless of their location rather than individually viewing a singular physical log book. Such a system for electronic communication, and related structures and operations, improves decision making and updating procedures for users, as compared to employing the physical logs or control room console.

Exemplary embodiments address the issues and shortcomings raised by previous methods in the related art.

Exemplary embodiments related to a layered structure of a work thread container and a work collaborator panel. The layered structure is directed towards achieving a clear presentation of work items or tasks on mobile devices. One or more embodiments may allow for easy creation and/or updating of a work item or task on the mobile device by a work collaboration assistance tool set. In non-limiting embodiments, work items and related comments are directly associated with an asset status. By having the communication of the work items through mobile devices, information can be disseminated and discussed among team members in a real time way to provide more insight information. In some embodiments, the work items and related comments are provided through an asset annotator, a process annotator in the way of text, and/or a screenshot on the mobile device. As such, the communication provides real time notification of work item creation and updates on mobile devices.

Non-limiting examples of the mobile device include cellular phones, tablets, phablets, laptops, personal digital assistants, and the like as would be understood by one of ordinary skill in the art.

FIG. 1 shows an exemplary system architecture for communicating information relating to a work item, the system having components that may operate independently or in unison with other components.

Some embodiments provide an work engineering wizard 115, which may comprise a set up user interface, for users, such as administrators, to build communication threads including building roles relating to tasks or work items, users of a system, work categories, relationships between role and user, and assignment of permissions for work categories and users/roles. The work engineering wizard 115 may be used to set the configuration of communication threads before implementation of the system by users to monitor or communicate regarding components.

In exemplary embodiments, there is a work thread container 103 providing a mechanism for plant staff to view and manage work threads on an electronic mobile device. Embodiments of the work thread container 103 may comprise of at least one of a work thread list module, a key search module, and a search overflow module (not shown). In some embodiments, these modules may be program code stored in at least one non-transitory recordable medium and implemented by a processor. The work thread list module may display relevant work thread items with fields such as a work author or recipient, including a small picture, a brief text description, a creation date, a status icon, and a notification indicator. The key search module may include a text based fuzzy search based on a brief description or a comment of the work thread. The overflow search module may provide additional searching options, such as a user based search, a role based search, a date based search, and a status based search. Considerations of groupings or separation of elements in and between the modules may relate to optimization of coding requirements as well as to display of a user interface having these modules cleanly on the mobile device.

Exemplary embodiments of the work thread container 103 may comprise of:

Work thread list display. In consideration of potential screen size limits of the devices used, the work thread list may display highlights from at least one of a field of work item author, brief description, create date, status icon, and notification indicator by default in order to keep the mobile UI display simple and clean. In some embodiments, the system administrators may use the above mentioned work engineering wizard 115 to add or remove fields of work items shown on the work thread list, either before or after operation of the system.

Key based search. Users may be provided with an ability to perform text key search based on terms such as a work item description or its comments.

Search overflow. Users may be provided with additional search options such as a user based search, a role based search, a date based search, a status based search. Optionally, the search overflow options may be implemented together with the key based search feature. However, in some embodiments, the search overflow may be separate in order to keep implementation of search features clean and simple. As such, the user interface UI display may also be kept simple and clean by separating the additional search options separate from the key based search.

In exemplary embodiments, there is a work collaborator 104 configured to provide the plant staff with tools to collaboratively interact with regard to the work threads. The work collaborator 104 may be configured to allow users to author a work item, add information related to the work item, and collaborate around the work item. In some embodiments, the work collaborator may additionally be comprised of two component blocks with a work collaboration panel 105 and a work collaboration assistance tool set 106 with at least one of a plurality of annotators. These annotators, individually and collectively, provide an infrastructure for users to engage with the work item more closely, gather more insight information from the users in different worker roles, and source real time data. Through the system, a team of users can efficiently communicate and complete work on a work item in an efficient manner.

The work collaboration panel 105 may allow users to create a work item and provide detailed information regarding the work item by using one or multiple tools from the work collaboration assistance tool set 106. Through the work collaboration panel 105, users can reply or comment on the work item, as well as further detail the work item by adding more information, such as process real time data, historical data, device parameters, status, assignee settings, pictures, videos, and audio recordings.

Users can employ the work collaboration panel 105 to create a work item using a text input, and further add information to the work item to provide more insight work information by using at least one annotator from the work collaboration assistance tool set 106. Relevant users on a team can then enter their replies or comments for the work item. Users also can then annotate comments with comment-priority, comment-status, process real time data, process historical data, device-status, device-data, and picture/screenshot, video, and audio taken by mobile device.

The work collaboration assistance tool set 106 provides features for users to annotate the work item or comment through the mobile device. The work collaboration assistance tool set 106 may include at least one of a comment-priority annotator 107, a comment-status annotator 108, a real time process data annotator 109, a process historical data annotator 110, a real time asset data/status annotator 111, an assignee annotator 112, a picture annotator 113, and a work comment filter 114. In some embodiments, these annotators can be configured to provide users with the ability to easily add information to the work item through tapping selections on a touch screen of the mobile device.

The comment-priority annotator 107 allows a user to assign a priority to the work item. The priority may be shown by at least one of a text comment, a color code, or an icon.

The comment-status annotator 108 allows a user to assign a status to the work item. As such, the work item can be updated such that all relevant users on a team can see the status of the work item and understand any necessary follow up regarding the work item.

The process data annotator 109 is configured to access process data. In an exemplary embodiment, the process data annotator 109 is configured to communicate with a Distributed Control System (DCS) in order to provide access and retrieval of process data from the DCS. This can allow access to real time data in forms such as text or graphs that can then be communicated to the relevant users through the work thread. An example of a DCS that can be accessed is the [YOKOGAWA CENTUM VP].

The process historical data annotator 110 is configured to access process historical data. In an exemplary embodiment, the process historical data annotator 110 is configured to communicate with a Plant Historical System or Plant Information Management System (PIMS). This can allow access of process historical data in forms such as text or graphs that can then be communicated to the relevant users through the work thread. An example of a Plant Historical System or PIMS that can be accessed is the [YOKOGAWA EXAQUANTUM].

The asset status/data annotator 111 is configured to annotate an asset status or detailed parameters. In an exemplary embodiment, the asset status/data annotator 111 is configured to communicate with a plant asset management system. This can allow access of the asset status or detailed parameters in forms such as text or graphs that can then be communicated to the relevant users through the work thread. An example of a plant asset management system that can be accessed is the [YOKOGAWA PRM].

The assignee annotator 112 is configured for a user to assign the particular work item to a particular set of users or a group. In some embodiments, only particular users will be allowed to make assignments. In other embodiments, all the users may be allowed to make assignments.

The picture annotator 113 is configured for users to take picture from a mobile device directly, by camera or screenshot.

The work comment filter 114 is configured for users to choose what kinds of work comment items to display in the work collaboration panel 105.

Accordingly, the exemplary annotators of the work collaboration assistance tool set 106 allow users to add real-time status/data of a plant process or asset to the comments of a work thread to provide more insight of the work and engage users in different roles and different locations, thus making it easier for members of a team, or multiple teams to collaborate on work items or tasks.

In one or more exemplary embodiments, a work notification delivery module 102 can provide notification of new or updated information relating to the work thread. In some embodiments, the work notification delivery module 102 may be comprised of one or more of at least three levels of notifications. The work notification delivery 102 is configured to deliver the work item creation/update to the particular group in real-time. As the members of a work team might come from the same or different shifts or departments, or they may have different roles, they may not work at the same places or at the same time. By delivering updates in real time via the mobile devices, work item information can be timely delivered to relevant users without concern for different locations or working schedules of the users. As such, the efficiency of the decision making process for the team may be improved.

The three levels of notification by the work notification delivery module 102 may include:

Comment level update notifications. When the priority or status of a comment is updated or a new comment is added to a particular work thread by a user, the relevant comments will be indicated or shown in the work collaboration panel for the other users to view.

Work thread level update notification. When a work thread is added or updated, a notification indicator will be annotated to the work thread in the work thread container 103.

Mobile device notification center 101. When the work notification delivery module is integrated with the mobile device notification center 101 built in the mobile device, the mobile device notification center 101 provides notification when there is creation of a new work thread, addition to a work thread, or update of a work thread.

In exemplary embodiments, the system may operate through the mobile device with [GSM], [BLUETOOTH], [WI-FI], [WI-MAX], or other communication standards between devices.

Although FIG. 1 illustrates an exemplary system with numerous components, one of ordinary skill would understand that the presence of each and every component is not required in the various embodiments.

Work Thread Container

Figure 2:
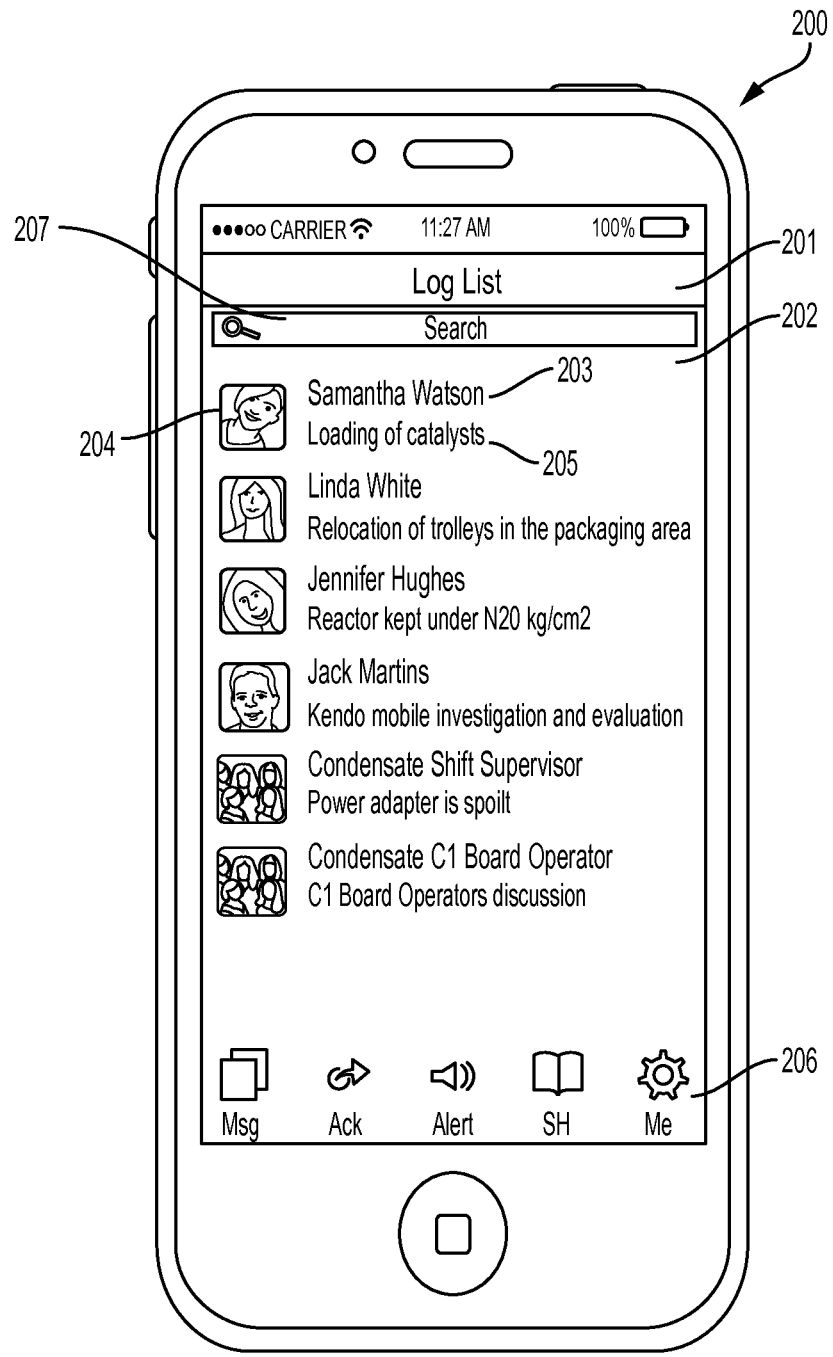
FIG. 2 illustrates an exemplary embodiment of a work thread container as represented in a graphical user interface for a mobile device.

FIG. 2 shows an exemplary embodiment of the work thread container 103, as represented in a graphical user interface for a mobile device 200 with a work thread list display. The log list 201 shows a list of work threads 202 for a user to manage on the mobile device 200.

Within the log list 201, each work thread 202 may include a name of the other communicating user or users 203, a picture of the other user(s) 204, and a brief description 205 of the work thread 202. The amount of detail and size of the information in the log list 201 for each work thread 202 may be adjusted depending on the size of the mobile device. Accordingly, a larger device, such as a tablet, may show more description of the work thread 202 than a smartphone.

Clicking on one of the work threads 202 will result in the user interface navigating to a detailed view of the selected work thread 202. Additionally, the other communicating user or users 203 may be identified as an individual, a role—a group of persons organized by their role), or a group—a mixing of individual and roles.

The user interface also provides a field for a key word based search 207.

The user interface provides for additional options icons 206 for operations involving the work threads 202. For example, these additional options may include sending a message to someone, acknowledging a work thread, setting an alert, implementation of a shift handover system, and additional settings.

In some embodiments, the setting of an alert through the additional options icons 206 may change how the mobile device notifies a user of updates to the work thread. Alternatively, in some embodiments, an alert may be triggered for specific key word or code sent to the work thread. Setting of the specific alert based on a trigger may aid in quickly alerting all relevant users to a problem.

Work Collaborator

Figure 3:
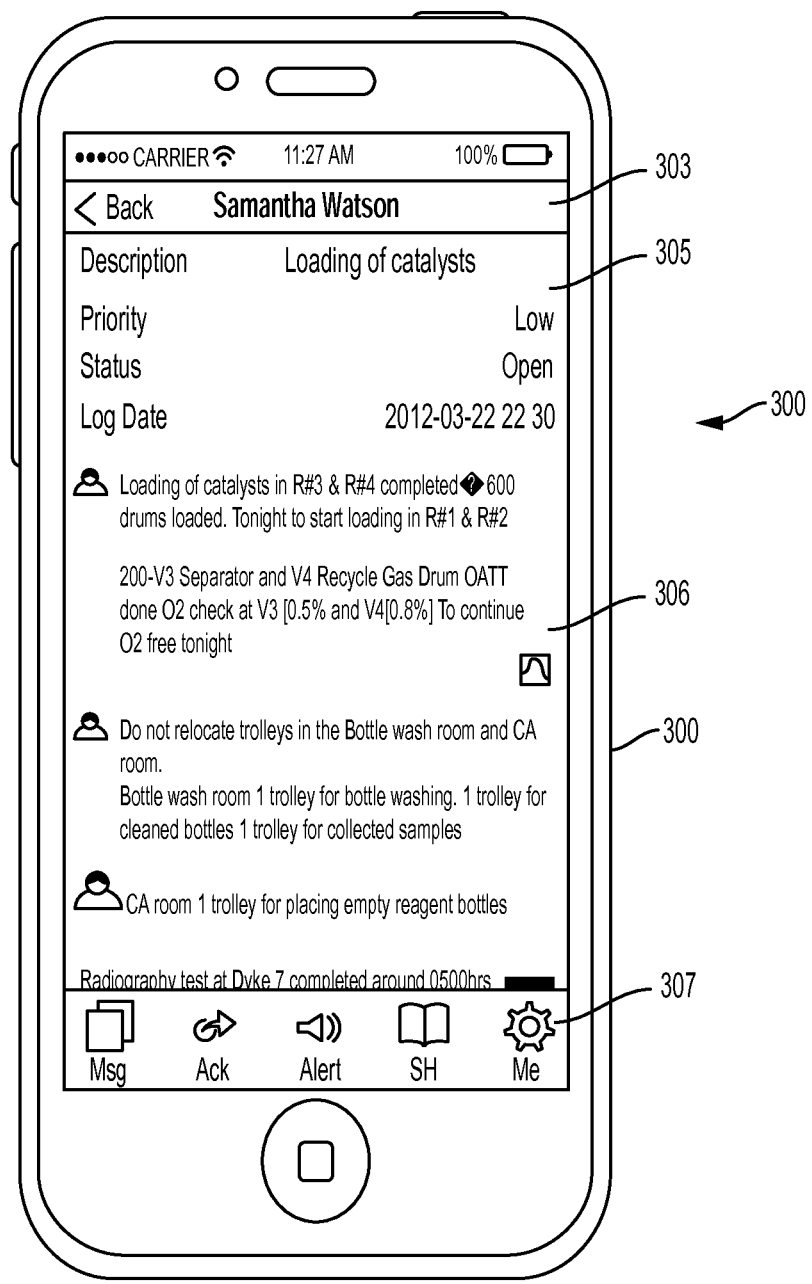
FIG. 3 illustrates an exemplary embodiment of a work collaborator as represented in a graphical user interface for a mobile device.

FIG. 3 shows an exemplary embodiment of a work collaborator 104. In one or more embodiments, clicking on one of the work threads 202 from the list of work threads in a log list 201 brings up a detailed view 300 of the selected work thread 202.

In the detailed view 300, the user or users 303 of the selected work thread is displayed. Additionally, the details 305 of the work thread as well as the related communications 306 between users are also displayed.

The details 305 may include a description of the work item or task, a priority of the work item, a status, and a log date. The details 305 may be fixed in position on the display. Concurrently, communications 306 may also be displayed. As additional communications are sent or received by the mobile device, the communications are scrollable. However, although the communications are scrollable once they exceed the allocated display area, the details 305 remain displayed.

In some embodiments, the details 305 of the work thread are updateable by all users. In other embodiments, the details 305 of the work thread are only updateable by specific authorized users.

The user interface provides for additional options icons 307 for operations involving the work thread. For example, these additional options may include sending a message, acknowledging a communication, setting an alert, implementation of a shift handover system, and additional settings.

Figure 4:
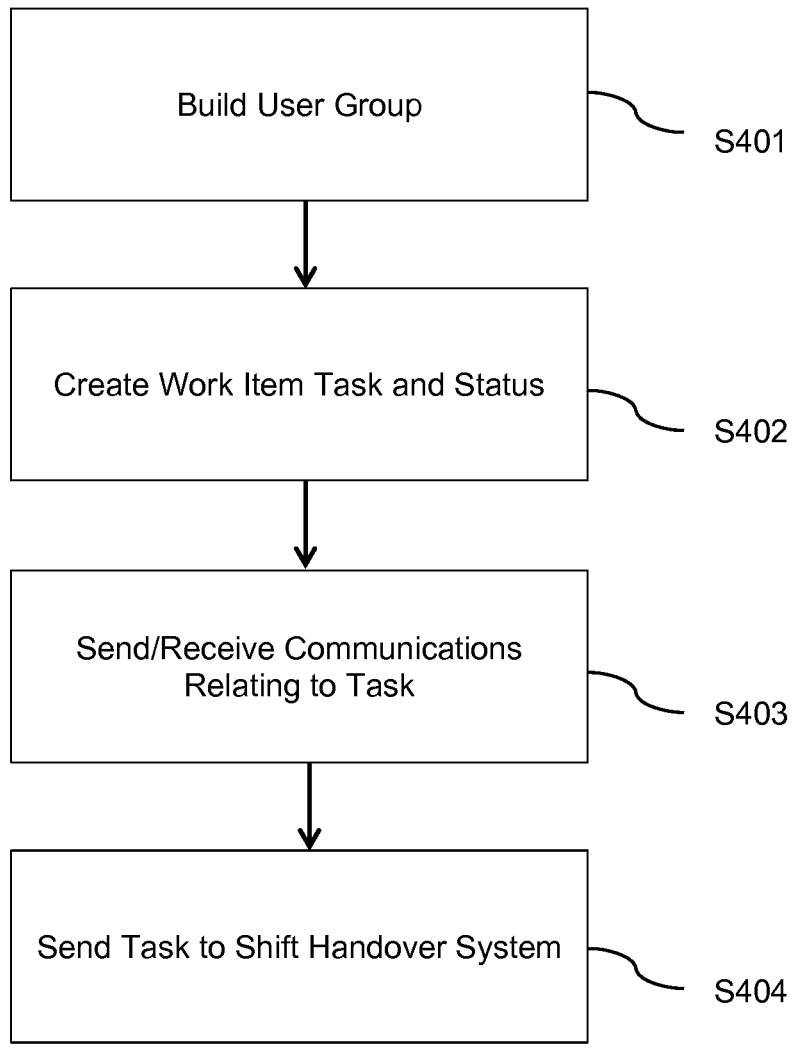
FIG. 4 illustrates a flowchart of an exemplary embodiment of a method of building a work item.

FIG. 4 shows a flow chart of an exemplary embodiment of a method of building a work item. The method for communication comprises building a user group S401 from a plurality of users and creating a task or work item S402. The work item S402 can include a status as well as other information, such as a priority level and log date. The method further includes sending and receiving a communication relating to the work item S403 with the user group. When it is needed, the created work item from S402 and the communications relating to the work item from S403 can be sent to a shift handover report S404. Through this process, users in a group on a following shift can access and view all the pertinent information for the work item.

Figure 5:
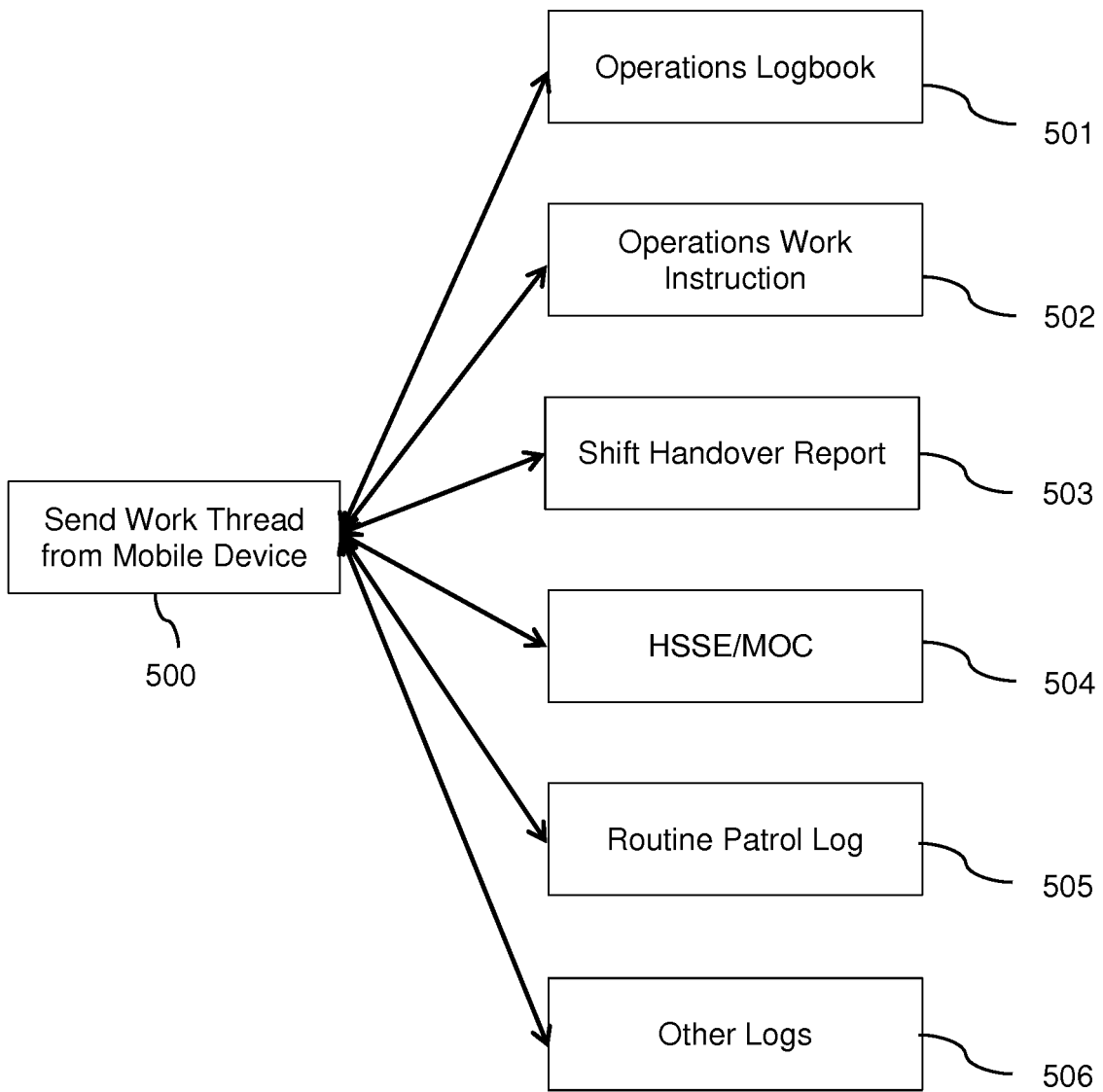
FIG. 5 illustrates an exemplary integration with a shift handover system.

FIG. 5 shows an exemplary integration with a shift handover system and the various elements of the shift handover system that may receive work item information from the mobile device 500. The elements include an operations logbook 501, an operations work instruction 502, a shift handover report 503, a Health Safety Security and Environment (HSSE)/Management of Change (MOC) log 504, a routine patrol log 505, and other logs 506. The operations logbook 501 may provide for an operator to quickly log any issue that occurs during the day in the plant. The information that is logged may be used for issue tracking and also reported during shift handover. The operations work instruction 502 may allow a manager to dispatch work to subordinates as well as to monitor their work progress. The shift handover report 503 may provide a tool for a shift operator, supervisor and manager to perform activities related to plant shift changes. Portions of the HSSE/MOC log 504 may provide tools to facilitate recording and management of plant changes. The MOC log may allow plant personnel to raise change requests and coordinate and/or enforce the process of reviewing, approving and implementing a change request based on different change types. The HSSE log may provide tools to facilitate recording and management of plant incidents. The routine patrol log 505 may log a scheduled routine task, which is performed in a recurring manner at the plant field. Other logs 506 may include work permissions, such as a plant work permission that is used to issue, approve, perform, and manage work permission for the plant.

The information from the work item priority, status, and communications may all be attributed to the various elements of the shift handover system in order to provide sufficient information for look up by following shifts.

Submenu for Attaching Parameter Data

Figure 6:
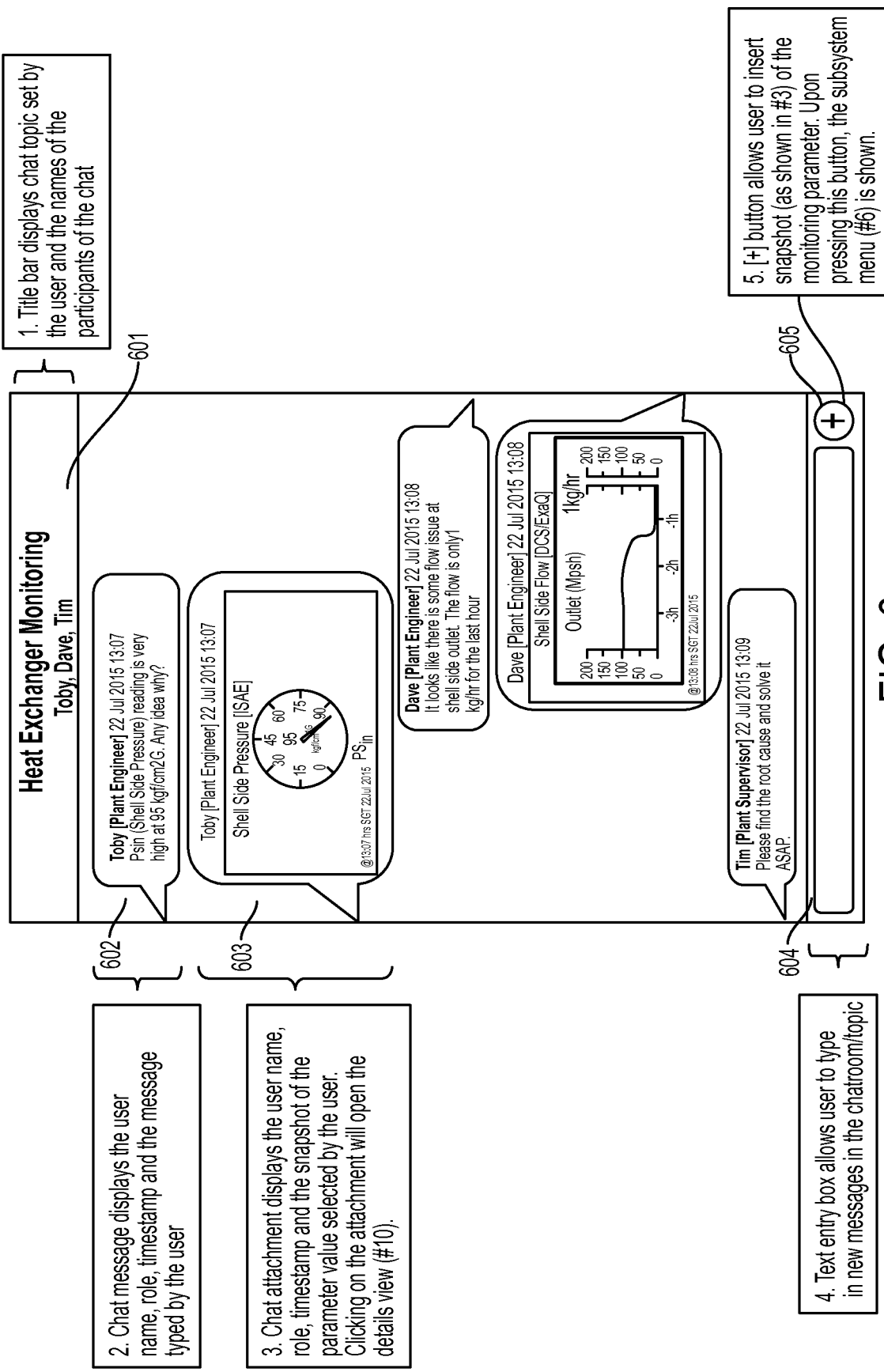
FIG. 6 illustrates an exemplary embodiment of communications in a work thread.

FIG. 6 shows an exemplary embodiment of communications in a work thread 601. The communications include text messages 602 that may display a message as well as the sender, a role of the sender, and a timestamp. A user may add to the work thread through a text entry box 604 or may include an attachment 603, such as a snapshot of a parameter value. The attachment may be easily added through a submenu icon 605.

Figure 7:
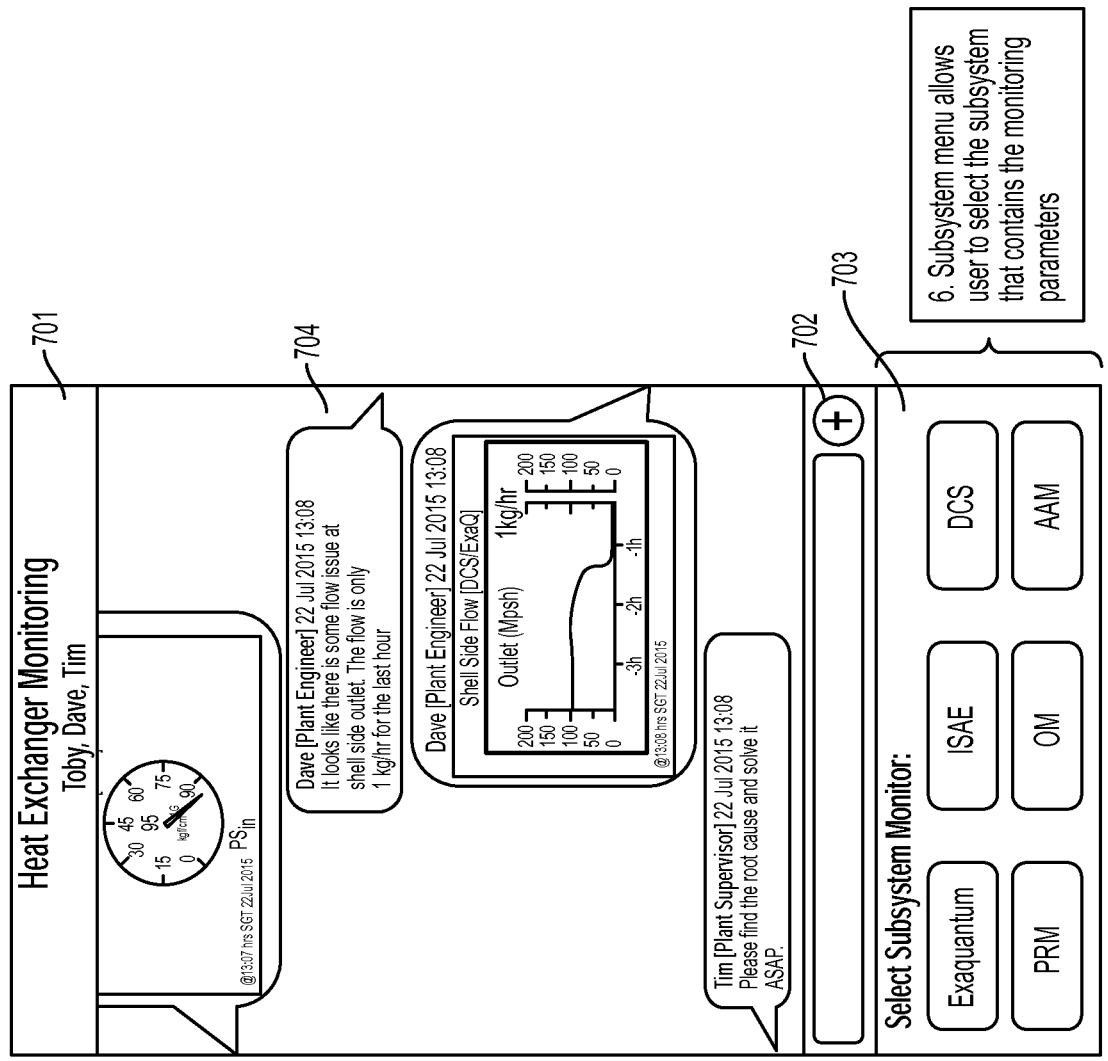
FIG. 7 illustrates an exemplary embodiment of a submenu in a work thread.

FIG. 7 shows an exemplary embodiment of a submenu in a work thread 701. The communications include text messages 704 that may display a message as well as the sender, a role of the sender, and a timestamp. When a user wishes to add an attachment to the work thread and clicks a submenu icon 702, a submenu 703 is displayed. The submenu 703 may display a various number of icons representing subsystems for a plant or operation. In some embodiments, the submenu may be text based icons. However, alternative icons for identifying subsystems, such as pictures, may be used.

Figure 8:
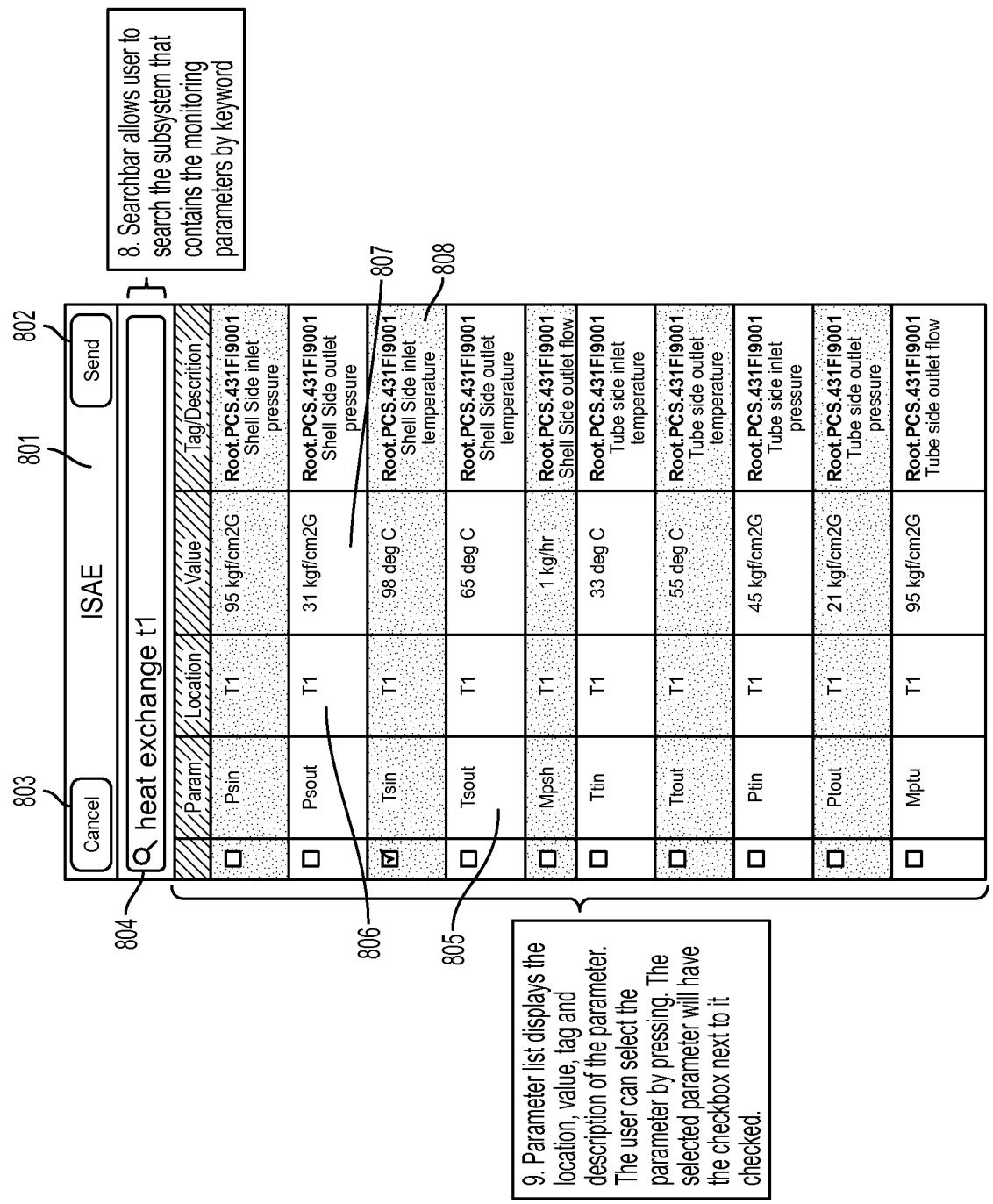
FIG. 8 illustrates an exemplary embodiment of a parameters list displayed in response to selecting the submenu.

In some embodiments, as shown in FIG. 8, a parameters list 805 is displayed in response to selecting an icon of the submenu 703. The parameters list 805 also displays location information 806, a parameter value 807, and a description 808 for each parameter. If an incorrect submenu 801 is selected, a user can close the display of the parameters list 805 by clicking a cancel button 803. If a user desires to send information related to a particular parameter, the user may do so by selecting the desired parameter and clicking a send button 802. The user may also select multiple parameters for a single sending for efficiency.

Figure 9:
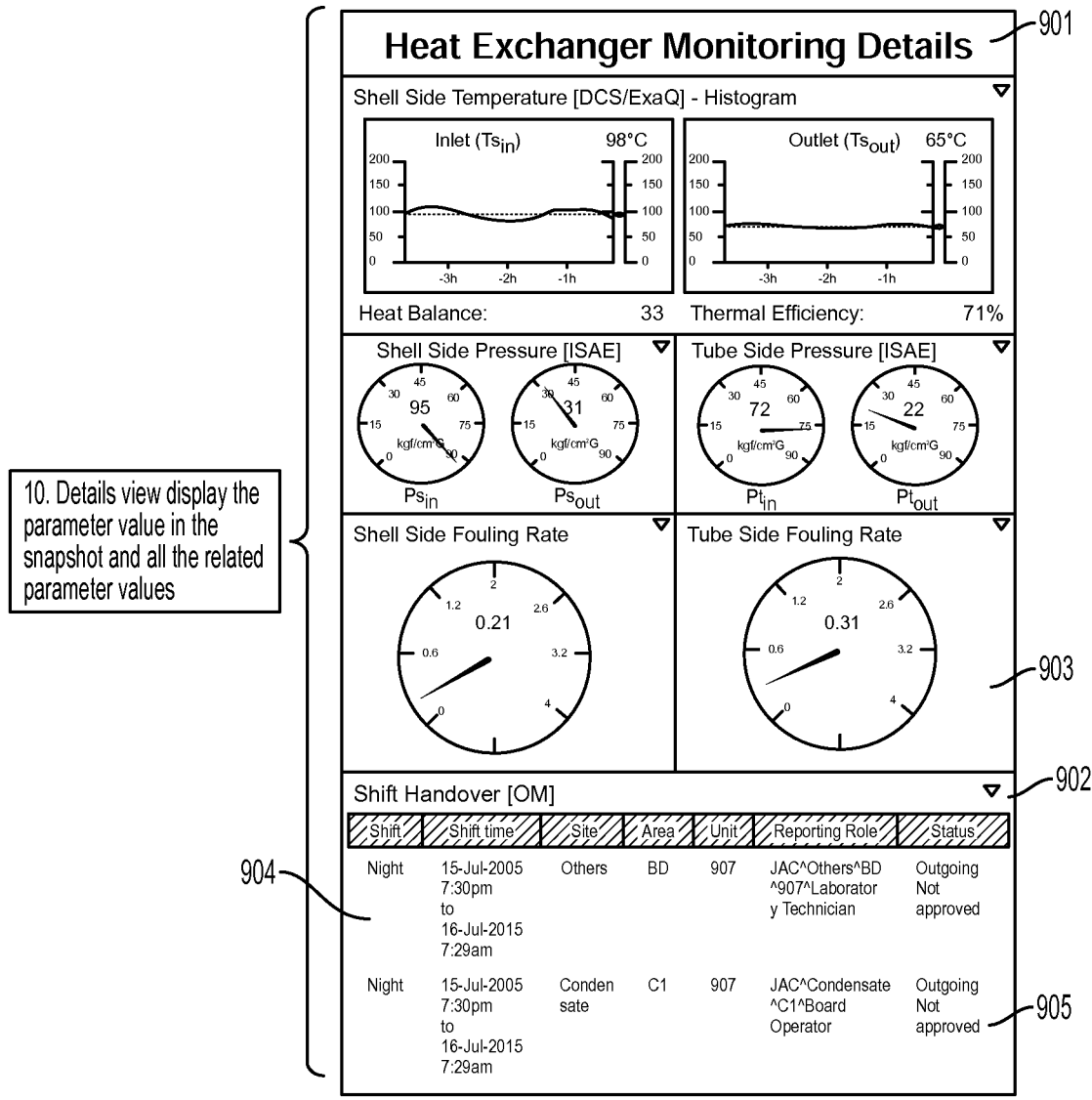
FIG. 9 illustrates an exemplary embodiment of a graphical parameters list displayed in response to selecting the submenu.

Alternatively, as shown in FIG. 9, a detailed view of the parameters for a subsystem 901 may be shown through graphical charts 903. In some embodiments, clicking on a specific graphical chart 903 may send it to the work thread for communication to the other users. Alternatively, a selection of at least one graph and sending through clicking a send button similar to FIG. 8 may be implemented.

In some embodiments, logs from shift handover reports that are relevant to the subsystem can also be accessed and displayed 902. Information regarding the specific work item 904 as well as the status of any work items 905 may be displayed.

Figure 10:
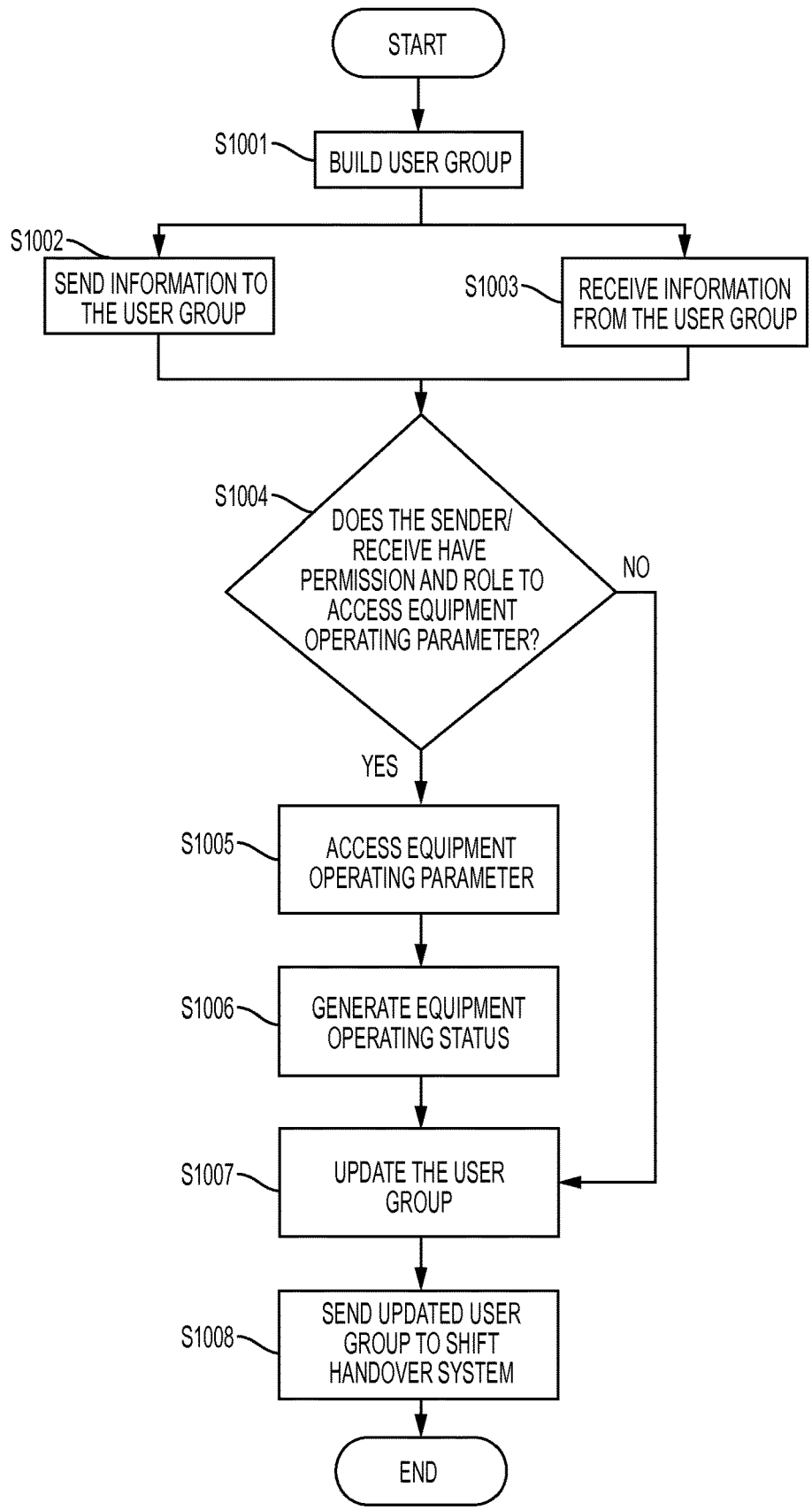
FIG. 10 illustrates a flowchart of an exemplary embodiment of a method of sharing information with a user group

FIG. 10 shows a flowchart of an exemplary embodiment of a method of sharing information with a user group. The method for communication comprises building a user group S1001 from a plurality of users. Then, either information can be sent to the user group S1002 or received from the user group S1003. The method then checks to see if the user sending or receiving the information has permission and/or a role to access the Equipment Operating Parameter S1004. If the user has permission and/or the role to access the Equipment Operating Parameter, the user can access an equipment operating parameter S1005. The equipment operating parameter may be accessed through a server connected to a plant or a DCS. From the equipment operating parameter, an equipment operating status can be generated S1006. The equipment operating status can then be used to update the user group at step S1007.

Alternatively, if the user does not have permission and/or the role to access the Equipment Operating Parameter, the information may be used to update the user group at step S1007 without the ability to access the equipment operating parameter S1005 or generate the equipment operating status S1006.

When it is needed, the information from the updated user group at step S1007 can be sent to a shift handover report S1008. Through this process, a following shift of users can access and view all the pertinent information for the work item.

Use of Enhanced Sensors from the Mobile Device

In one embodiment, the mobile device can take a photograph, record audio, or record video using onboard sensors and communicate them to the work thread. According to one embodiment, the advanced sensors available in the off the shelf mobile device hardware can be leveraged to seamlessly provide information to supplement the data received from a DCS.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Although the drawings describe the UI views in a specific order or layout, one should not interpret that the UI views are performed in a specific order or layout as shown in the drawings or successively performed in a continuous order, or that all the UI views are necessary to obtain a desired result. Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

There is claimed:

1. A method comprising:
generating, by at least one processor, a work item to be performed with respect to an equipment in an industrial plant;
transmitting, by the at least one processor, a first electronic communication comprising the generated work item to a plurality of mobile devices distributed at different locations and belonging to a user group associated with the industrial plant;
receiving, from a first mobile device of the plurality of mobile devices by the at least one processor, a first work item information related to the work item;
sending, by the at least one processor, a second electronic communication comprising the first work item information to the plurality of mobile devices as an informational message in a collaborative communication work thread associated with the work item;
communicating, by the at least one processor, with a plant asset management system of the industrial plant and retrieving a list of parameters of a subsystem from among a plurality of subsystems of the industrial plant;
transmitting, by the at least one processor, the list of parameters of the subsystem for display on the first mobile device;
receiving, by the at least one processor, a selection input provided at the first mobile device selecting one or more parameters from the list of parameters;
accessing, by the at least one processor in response to receiving the selection of the one or more parameters, real-time operating data of the one or more parameters from a server of a distributed control system;
sending, by the at least one processor, a third electronic communication comprising the real-time operating data to the plurality of mobile devices as an attachment message in the collaborative communication work thread that, when selected via an input provided by one or more of the plurality of mobile devices, causes the one or more of the plurality of mobile devices to open and display a details view of the one or more parameters;
monitoring, by the at least one processor, electronic communications from one or more other mobile devices of the plurality of mobile devices for an update to the collaborative communication work thread; and
sending, by the at least one processor, a fourth electronic communication comprising the update to the plurality of mobile devices causing the plurality of mobile devices to display content of the fourth electronic communication as an update message in the collaborative communication work thread.

2. The method according to claim 1, wherein the collaborative communication work thread includes a priority of the work item.

3. The method according to claim 1, wherein each of the first work item information and the update comprises at least one of an equipment operating indicator, a text message, a voice message, a photograph, or a video.

4. The method according to claim 1, wherein each of the first work item information and the update comprises a work item completion status of the work item.

5. The method according to claim 1, further comprising sending, by the at least one processor, the collaborative communication work thread to a plurality of second mobile devices operating on another shift in the industrial plant.

6. The method according to claim 1, wherein the attachment message comprises a timestamp and a snapshot of the real-time operating data.

7. The method according to claim 1, wherein the collaborative communication work thread is caused to render to the plurality of mobile devices as a chat interface comprising messages associated with at least one of timestamp and user.

8. A system comprising:
a plurality of mobile devices belonging to a user group associated with an industrial plant; and
a server comprising at least one non-transitory computer readable medium operating to store program code; and
at least one processor operating to read the program code and operate as instructed by the program code to implement:
a work thread container that stores and manages a plurality of collaborative communication work threads, each collaborative communication work thread of the plurality of collaborative communication work threads corresponding to communications between the plurality of mobile devices related to a work item; and a work collaboration panel that is implemented by the at least one processor to:
  generate the work item and the collaborative communication work thread associated with the work item in the work thread container,
  the work item to be performed with respect to an equipment in an industrial plant, and
  transmit a first electronic communication comprising the generated work item to the plurality of mobile devices distributed at different locations;
  receive, from a first mobile device of the plurality of mobile devices, a first work item information related to the work item;
  send a second electronic communication comprising the first work item information to the plurality of mobile devices as an informational message in the collaborative communication work thread associated with the work item;
  communicate with a plant asset management system of the industrial plant and retrieve a list of parameters of a subsystem from among a plurality of subsystems of the industrial plant;
  transmit the list of parameters of the subsystem to the first mobile device causing the list of parameters to display on the first mobile device;
  receive a selection input provided at the first mobile device selecting one or more parameters from the list of parameters;
  access, in response to receiving the selection of the one or more parameters a real-time operating data of the one or more parameters from a server of a distributed control system;
  send, a third electronic communication comprising the real time operating data to the plurality of mobile devices as an attachment message in the collaborative communication work thread that, when selected via an input provided by one or more of the plurality of mobile devices, causes the one or more of the plurality of mobile devices to open and display a details view of the one or more parameters;
  monitor electronic communications from the plurality of mobile devices for an update to the collaborative communication work thread; and
  send a fourth electronic communication comprising the update to the plurality of mobile devices that causes the plurality of mobile devices to display content of the fourth electronic communication as an update message in the collaborative communication work thread.

9. The system according to claim 8, wherein the collaborative communication work thread includes a priority of the work item.

10. The system according to claim 8, wherein each of the first work item information and the update comprises at least one of an equipment operating indicator, a text message, a voice message, a photograph, or a video.

11. The system according to claim 8, wherein each of the first work item information and the update comprises the work item and a task completion status of the work item.

12. The system according to claim 8, wherein the attachment message comprises a timestamp and a snapshot of the real-time operating data.

13. The system according to claim 8, wherein the collaborative communication work thread is caused to render to the plurality of mobile devices as a chat interface comprising messages associated with at least one of timestamp and user.

14. The system according to claim 8, wherein the attachment message comprises a timestamp and a snapshot of the real-time operating data.

15. The system according to claim 8, wherein the collaborative communication work thread is caused to render to the plurality of mobile devices as a chat interface comprising messages associated with at least one of timestamp and user.

16. A server apparatus comprising:
  at least one non-transitory computer readable medium operating to store program code;
  at least one processor operating to read the program code and operate as instructed by the program code to:
    generate a work item to be performed with respect to an equipment in an industrial plant;
    transmit a first electronic communication comprising the generated work item to a plurality of mobile devices distributed at different locations and belonging to a user group associated with the industrial plant;
    receive, from a first mobile device of the plurality of mobile devices, a first work item information related to the work item;
    send a second electronic communication comprising the first work item information to the plurality of mobile devices as an informational message in a collaborative communication work thread associated with the work item;
    communicate with a plant asset management system of the industrial plant and retrieve a list of parameters of a subsystem from among a plurality of subsystems of the industrial plant;
    transmit the list of parameters for display on the first mobile device;
    receive a selection input provided at the first mobile device selecting one or more parameters from the list of parameters from the first mobile device;
    access, in response to receiving the selection of the one or more parameters, real time operating data of the one or more parameters from a server of a distributed control system:
    send a third electronic communication comprising the real-time operating data to the plurality of mobile devices as an attachment message in the collaborative communication work thread that, when selected via an input provided by one or more of the plurality of mobile devices, causes the one or more of the plurality of mobile devices to open and display a details view of the one or more parameters;
    monitor electronic communications from the plurality of mobile devices for an update to the collaborative communication work thread; and
    send a fourth electronic communication comprising the update to the plurality of mobile devices that causes the plurality of mobile devices to display content of the fourth electronic communication as an update message in the collaborative communication work thread.

17. The apparatus according to claim 16, wherein the collaborative communication work thread includes a priority of the work item.

18. The apparatus according to claim 16, wherein each of the first work item information and the update comprises at least one of an equipment operating indicator, a text message, a voice message, a photograph, or a video.

19. The apparatus according to claim 16, wherein each of the first work item information and the update comprises a work item completion status of the work item.

20. The method according to claim 7, further comprising:
setting, by the at least one processor, an alert that triggers when a specific keyword is sent as a part of another message in the collaborative communication work thread; and
notifying, by the at least one processor in response to the alert triggering, at least one mobile device in the plurality of mobile devices of a change to another content of the collaborative communication work thread.

* * * * *